United States Patent
Ivanenko et al.

(10) Patent No.: US 10,822,241 B2
(45) Date of Patent: Nov. 3, 2020

(54) RECYCLING OF NUCLEAR LIQUID WASTE WITH BORON CONTROL

(71) Applicants: Joint Stock Company "Rosenergoatom", Moscow (RU); JOINT STOCK COMPANY "SCIENCE AND INNOVATIONS", Moscow (RU)

(72) Inventors: Vladimir Ivanovich Ivanenko, Murmanskaya (RU); Tat'yana Andreevna Sedneva, Murmanskaya (RU); Efroim Pinkhusovich Lokshin, St. Petersburg (RU); Roman Ivanovich Korneikov, Murmanskaya (RU)

(73) Assignees: JOINT STOCK COMPANY "ROSENERGOATOM", Moscow (RU); JOINT STOCK COMPANY "SCIENCE AND INNOVATIONS", Moscow (RU)

( * ) Notice: Subject to any disclaimer, the term of this patent is extended or adjusted under 35 U.S.C. 154(b) by 0 days.

(21) Appl. No.: 16/311,560

(22) PCT Filed: Mar. 22, 2018

(86) PCT No.: PCT/RU2018/000179
§ 371 (c)(1),
(2) Date: Dec. 19, 2018

(87) PCT Pub. No.: WO2018/190751
PCT Pub. Date: Oct. 18, 2018

(65) Prior Publication Data
US 2020/0024146 A1    Jan. 23, 2020

(30) Foreign Application Priority Data
Apr. 12, 2017 (RU) .................... 2017112521

(51) Int. Cl.
*B01D 61/44* (2006.01)
*C01B 35/10* (2006.01)
*C01D 1/20* (2006.01)
*G21F 9/12* (2006.01)

(52) U.S. Cl.
CPC .......... *C01B 35/1063* (2013.01); *B01D 61/44* (2013.01); *C01D 1/20* (2013.01); *G21F 9/12* (2013.01)

(58) Field of Classification Search
CPC ....... C01B 35/1063; B01D 61/44; G21F 9/12; C01D 1/20
See application file for complete search history.

(56) References Cited

U.S. PATENT DOCUMENTS

2015/0251137 A1* 9/2015 Wallace ................ B01D 61/58
210/259

* cited by examiner

*Primary Examiner* — Arun S Phasge
(74) *Attorney, Agent, or Firm* — Brandon V. Zuniga; James R. Gourley; Carstens & Cahoon, LLP

(57) ABSTRACT

The invention relates to the complex processing of a nuclear power plant's NPP's liquid, boron-containing waste with a complex composition, being generated during the operation of NPPs, including of ones VVER-type, and can be used to isolate boric and nitric acids and hydroxides of sodium and potassium for their reuse in the NPP process cycle. The invention allows to obtain crystalline boric acid and highly concentrated solutions of nitric acid and hydroxides of sodium and potassium, suitable for reuse in the NPP process cycle and for general industrial use. Conducting electrodialysis at low values of current and voltage provides a reduction of the method's energy intensity. The involvement of all major components of waste mother liquors into the processing reduces the amount of stored and disposed hazardous waste.

9 Claims, No Drawings

RECYCLING OF NUCLEAR LIQUID WASTE WITH BORON CONTROL

CROSS-REFERENCE TO RELATED APPLICATIONS

This application is a US 371 Application from PCT/RU2018/000179 filed Mar. 22, 2018, which claims priority to Russia Application 2017112521 filed Apr. 12, 2017, the technical disclosures of which are hereby incorporated herein by reference.

The invention is related to integrated recycling of complex liquid boric nuclear waste generated during operation of the nuclear power units, including VVER, and which can be used for extraction of boric and nitric acids, and compounds of alkaline elements to be further re-used in NPP process cycle.

Among all types of liquid nuclear waste generated by NPPs, evaporator sludge is the most difficult for recycling. This type of waste is high-salt nitrate solution of sodium and potassium, containing borates and hardware corrosion products in the form of transition metals salt, as well as decontamination agents delivered with various effluents. After decontamination the solution is evaporated to be converted into a fusion cake for further storage. This type of waste cannot be 100% recycled.

There is information about a boron-controlled method of liquid nuclear waste recycling (see patent No 2012076 RF, IPC$^5$G21F 9/08, 1994). This method involves vaporization of waste, crystallization of resulting boron-containing concentrate, separation of this concentrate from the mother liquor, dissolution, ultrafiltration of the resulting solution, ion-selective filtration, vaporization up to 80-250 g/l in equivalent of boric acid and crystallization of this acid. The yield of boric acid is less than 84% with impurity content of $10^{-2}$-$10^{-3}$ percent by weight.

Among the major disadvantages of this method are: high energy consumption for vaporization, low extraction of boric acid, the resulting solutions require post-purification. This method is used for recovery of boric acid only, which means a lot of non-recycled waste for further disposal.

There is also information about another method selected as a prototype, this is a boron-controlled method of liquid nuclear waste recycling (see U.S. Pat. No. 7,323,613 USA, IPC G21F 9/06, 9/20, G21C 1/00, B01D 61/42 (2006.01), 2008). This method is applied for liquid waste containing sodium and potassium nitrates and includes separate collection of acidic waste (pH<5.5), which does not contain boric acid, and alkaline waste (pH>5.5), which contain borates, followed by concentration and mixing, crystallization of sodium borate with pH 8.0-10.1, separation from the mother liquor, treatment of the solution with calcium and magnesium salts, preferable with calcium nitrate or magnesium chloride, and separation of the resulting borate precipitation of calcium or magnesium. Then the sodium borate precipitation is dissolved to reach concentration of 20-25 g/l and expose to electrodialysis with an electrodialysis device with anion- and cation-exchange membranes, as a result there are boric acid solutions (0.1-60 g/l) and sodium hydroxide solutions (with NaOH content up to 150 g/l). The parameters of electrodialysis are: current intensity=0.2-45 A, voltage=5-55 V This method has the following disadvantages: It provides only for the recovery of boric acid and sodium hydroxide, while the high-salt mother liquor (which does not contain borates) is not recycled, which means a lot of non-recycled waste for further disposal. There is another disadvantage of this method: the resulting boric acid solution is un-marketable, and sodium hydroxide solution is of low concentration which makes them difficult to re-use. High energy consumption is another disadvantage of this method. The reason is that the sodium borate solution exposed to electrodialysis has low sodium content and higher electrical resistance, thus higher current intensity and voltage are required for electrodialysis.

Purpose of this invention is to achieve a technical result, which can be described as recycling of complex nuclear liquid waste with high salt content to have a broader range of post-recycling products, in particular, marketable boric acid, concentrated solutions of nitric acid, sodium and potassium hydroxides, which can be re-used in NPP process cycle. The expected technical result involves achieving lower energy consumption and reduction of the amount of hazardous waste to be buried and to be stored.

The technical result is achieved through boron-controlled method of recycling liquid nuclear waste which contain sodium and potassium salts, including: adding calcium nitrate to the borate solution with further precipitation of sodium borate and separation of sodium borate from the mother liquor; followed by electrodialysis using an electrodialysis device with cathion- and anion-exchange chambers; followed by generation of boric acid and sodium and potassium hydroxide solutions; in accordance with the invention, the initial borate solution contains sodium and potassium nitrates and sulfates instead of sodium and potassium salts; calcium nitrate is added to the initial borate solution to have calcium borate and sulfate co-precipitated; boric acid is produced by treating calcium borate and sulfate with nitric acid solution with further separation of precipitated calcium sulfate from the calcium borate solution; after that calcium borate solution is treated with nitric acid to cause boric acid precipitation and calcium nitrate solution; boric acid precipitation is separated and dried, and the mother liquor is exposed to electrodialysis to produce nitric acid solution and sodium and potassium hydroxides.

The technical result is also achieved by adding the calcium nitrate into borate solution with pH 9.3-11.0

The technical result is also achieved by treating the co-precipitated calcium borate and sulfate with nitric acid solution to reach the value of pH 5-7.

The technical result is also achieved by treating the calcium borate solution with nitric acid under the temperature of 10-20° C. to reach the value of pH 1-3.

The technical result is also achieved by adding the calcium nitrate solution to the initial borate solution after separation of precipitation.

The technical result is also achieved by electrodialysis of the mother liquor in a 3-chamber electrodialysis device following the pre-defined volume to volume proportion of the mother liquor $V_{Mp}$ in the middle chamber of the electrodialysis device, and following the volume proportion of anolyte $V_a$ and catholyte $V_K$ in anode and cathode chambers respectively ($V_{Mp}$:$V_a$=1:0.5-1.0 and $V_{Mp}$:$V_K$=1:0.4-0.6), as a result the nitric acid solution will be produced in the anode chamber, while sodium hydroxide solution and potassium hydroxide solution will be produced in the cathode chamber.

The technical result is achieved by the following parameters of electrodialysis: current intensity=1-3 A, voltage=4-10 V.

The technical result is achieved by washing the boric acid precipitation with nitric solution (pH 2-3) containing boric acid with content of 30-35 g/l The technical result is achieved by drying the boric acid precipitation at a temperature not higher than 60° C.

The essential features of alleged invention which define the scope of legal protection and are sufficient for achieving the above technical result have the following functions and are relevant for achieving thereof as follows.

The fact that the initial borate solution contains calcium and sodium nitrates and sulfates means that electrodialysed nitric acid and alkaline solutions are suitable for re-use, after the sulfate ions in the form of slightly soluble products (for example, gypsum, which can be used in construction industry) are removed from the initial solution.

Adding calcium nitrate into the initial borate solution causes the co-precipitation of calcium borate and sulfate to form, this makes it possible to ensure good extraction of boron compounds from the solution and purify the solution from sulfate ions before electrodialysis.

Treatment of co-precipitated calcium borate and sulfate with nitric acid solution followed by conversion of calcium borate into the solution and extraction of precipitated calcium sulfate from the calcium borate solution provides for the good separation of boron compounds from the existing impurities and ensures high boron yield in the final product.

Treatment of calcium borate solution with nitric acid makes it possible to have the boric acid precipitation which can be easily separated from the calcium nitrate solution.

Drying of washed boric acid precipitation ensures higher boric acid content in the final product.

Electrodialysis of the mother liquor which is a result of separation of co-precipitated calcium borate and sulfate requires lower current intensity and voltage values, and provides for extraction of usable components in the form of highly concentrated nitric acid solutions, solutions of sodium and potassium hydroxides which are suitable for re-use in NPP process cycle.

The combination of the above features is necessary and sufficient to achieve the technical result of the invention which can be described as having a broader range of resulting products, such as marketable boric acid and concentrated solutions of nitric acid, sodium and potassium hydroxides suitable for re-use in NPP process cycle, as well as reduction of energy consumption and reduction of the amount of hazardous waste to be buried and to be stored.

For special cases of invention application the following operations and process parameters are preferred:

Adding calcium nitrate to borate solution under pH 9.3-11.0 provides for good extraction of boron compounds from the solution and makes it possible to purify the solution from sulfate ions before electrodialysis. Adding calcium nitrate under pH lower than 9.3 or higher than 11.0 results in partial dissolution of calcium borate followed by lower extraction and co-precipitation.

The co-precipitation of calcium borate and sulfate should be treated with nitric acid solution to reach pH value of 5-7, because the solubility of borate compounds in this pH range is highest. If the borate solution has pH lower than 5, the boron yield is also lower because slightly soluble boric acid has been formed. This is the reason why it is impossible to produce highly concentrated boron-containing solutions. If the borate solution has pH higher than 7, slightly soluble sodium borates are formed, they make separation of co-precipitation impossible.

The calcium borate solution should be treated with nitric acid solution to reach pH value of 5-7. Treating the calcium borate solution (pH<1) with nitric acid will results in excessive consumption of nitric acid for extraction of boric acid precipitation. With pH over 3 the solid yield of boric acid is also lower.

Treating of calcium borate solution with nitric acid at a temperature of 10-20° C. provides for the best conditions for precipitation of boric acid from the solution. If the temperature is above 20° C., the solubility of boric acid increases and the boron yield becomes lower. If treated at a temperature below 10° C., the solution requires to be cooled and the actual yield of the boron does not get higher.

Adding calcium nitrate solution to initial borate solution after separation of boric acid precipitation makes it possible to reduce the amount of waste and provides for better use of chemical agents.

If the mother liquor is electrodialysed following the pre-defined volume to volume proportion of the mother liquor in the middle chamber of 3-chamber electrodialysis device, and following the volume proportion of anolyte $V_a$ and catholyte $V_K$ in anode and cathode chambers respectively, it will be possible to control the concentration of resulting products—nitric acid solution, sodium hydroxide solution and potassium hydroxide solution. If the required intervals ($V_{Mp}:V_a=1:0.5$-$1.0$ and $V_{Mp}:V_K=1:0.4$-$0.6$ of the mother liquor volume against the volume of anolyte and catholyte) were not adhered to, it will not be possible to have the nitric acid solutions and alkaline solutions with the necessary concentration range (300-600 g/l) for re-use.

Electrodialysis carried out under the following parameters: current intensity=1-3 A, voltage=4-10 V, ensures over 99% ions to be extracted from the saline solution with lower energy consumption and with the current yield of about 50-70% Electrodialysis carried out under I<1A and V<4V will result in unreasonable increase of the process duration and lower efficiency, with I>3A and V>10 V the current yield becomes lower and the energy consumptions rises.

Washing the boric acid precipitation with nitrate solution (pH=2-3) with boric acid content of 30-35 g/l provides for removal of impurities to produce the sufficiently pure final product boric acid ($H_3BO_3$.) Boric acid is least soluble in these intervals of process parameters. The boric acid content in the nitrate solution used for washing ensures a stable value of the pre-defined pH values interval for the nitrate solution. Using nitrate solution with boric acid content lower than 30 g/l will cause partial dissolution of the washed precipitation and with the nitrate solution with boric acid content over 35 g/l the washing solution will get precipitated.

Drying of washed boric acid precipitation under the temperature not exceeding 60° C. ensures boric acid mass content in the final product not less than 99.9 percent by weight. If the temperature is above 60° C., the boric acid may turn into an oxide due to deep dehydration. The lower value of temperature interval was defined following the duration of drying process and may be dependent of rarefaction of operational atmosphere.

The above particular features of the invention will allow to implement this method at its best in terms of the opportunity of have a broader range of products for re-use in NPP process cycle, and to reduce energy consumption and the amount of hazardous waste to be buried and to be stored.

The core idea of the proposed method can be illustrated with the below Examples.

EXAMPLE 1

We take 1,000 ml of initial borate solution which contains, g/l: 104 $Na^+$, 50.8 $K^+$, 263 $NO_3^-$, 24 $SO_4^{2-}$, 5.3 $Cl^-$, 42 $H_3BO_3$, pH (borate solution)=8.7. pH of initial solution is upgraded to reach the value of 11 by adding 69 ml of NaOH solution (8.5 mole/l) After that 149 ml of $Ca(NO_3)_2$ solution (5.5 mole/l) are added to borate solution As a result a co-precipitation of calcium borate and sulfate is generated. After the generated co-precipitation is separated from the solution using the method of filtration, 1.168 ml of mother liquor are electrodialysed, and co-precipitated calcium borate and sulfate are used for producing boric acid.

Co-precipitated calcium borate and sulfate are treated with the solution which contains nitric acid (48.4 ml with concentration=12.2 mole/l) and 120 ml of water to reach the value of pH=5 with further conversion of calcium borate into a solution and separation of calcium sulfate precipitation (34 g) which, in terms of the equivalent amount of anhydrous salt, is 6.95% of overall salt content in the mother liquor. After that the sodium borate solution is treated with nitric acid solution (48.4 ml, concentration=12.2 mole/l) at a temperature of 20° C. to reach the value of pH=1. The generated boric acid co-precipitation is separated from calcium nitrate solution, then washed with nitrate solution (pH=2) which contains boric acid (concentration=35 g/l) and dried at a temperature of 55° C. As a result 32.4 g of boric acid are generated. The calcium nitrate solution is added to the initial borate solution after separation of boric acid precipitation.

The mother liquor is electrodialysed in a 3-chamber electrodialysis device with cathion- and anion-exchange membranes. 1,168 ml of mother liquor are exposed to electrodialysis, the solution contains, g/l: 319 $NO_3^-$, 0.8 $SO_4^{2-}$, 4.6 $Cl^-$, 102 $Na^+$, 44 $K^+$ and 4.8 $H_3BO_3$, with I=2 A, V=6 V and following the proportion: $V_{Mp}:V_a$=1:0.5 and $V_{Mp}:V_K$=1:0.5 to have as a result 584 ml of nitric acid solution generated in the anode chamber, this solution contains, g/l: 648.3 $HNO_3$, 1.63 $H_2SO_4$, 9.5 HCl, in cathode chamber there are 584 ml of sodium and potassium hydroxide solution, which contains, g/l: 354.8 NaOH, 181.4 KOH, and in the middle chamber there are 1.168 ml of demineralized mother liquor which contains 1.6 g/l of the following ions: $NO_3^-$, $SO_4^{2-}$, $Cl^-$, $Na^+$, $K^+$ and 4.8 g/l of $H_3BO_3$. Ion extraction from the mother liquor is 99.5%. The current yield of electrodialysed products is 60%.

EXAMPLE 2

We take 1,000 ml of initial borate solution which contains, g/l: 111.3 $Na^+$, 31.5 $K^+$, 244.3 $NO_3^-$, 35.5 $SO_4^{2-}$, 10.2 $Cl^-$, 34.6 $H_3BO_3$, solution pH=8.5. pH of initial solution is upgraded to reach the value of 9.3 by adding 54 ml of NaOH solution (8.5 mole/l) After that 132 ml of $Ca(NO_3)_2$ solution (5.5 mole/l) are added to borate solution As a result a co-precipitation of calcium borate and sulfate is generated. After the generated co-precipitation is separated from the solution using the method of filtration, 1150 ml of mother liquor are electrodialysed, and co-precipitated calcium borate and sulfate are used for producing boric acid.

Co-precipitated calcium borate and sulfate are treated with the solution which contains nitric acid (41 ml with concentration=12.2 mole/l) and 150 ml of water to reach the value of pH=7 with further conversion of calcium borate into a solution and separation of calcium sulfate precipitation (50.3 g) which, in terms of the equivalent amount of anhydrous salt, is 10.8% of overall salt content in the mother liquor. After that the sodium borate solution is treated with nitric acid solution (41 ml, concentration=12.2 mole/l) at a temperature of 10° C. to reach the value of pH=3. The generated boric acid co-precipitation is separated from calcium nitrate solution, then washed with nitrate solution (pH=3) which contains boric acid (concentration=30 g/l) and dried at a temperature of 60° C. As a result 27.5 g of boric acid are generated. The calcium nitrate solution is added to the initial borate solution after separation of boric acid precipitation.

The mother liquor is electrodialysed in a 3-chamber electrodialysis device with cathion- and anion-exchange membranes. 1.150 ml of mother liquor are exposed to electrodialysis, the solution contains, g/l: 291.4 $NO_3^-$, 1.2 $SO_4^{2-}$, 8.9 $Cl^-$, 106.7 $Na^+$, 27.4 $K^+$ and 3.1 $H_3BO_3$, with I=2 A, V=6.2 V and following the proportion: $V_{Mp}:V_a$=1:0.5 and $V_{Mp}:V_K$=1:0.4 to have as a result 575 ml of nitirc acid solution generated in the anode chamber, this solution contains, g/l: 592.2 $HNO_3$, 2.45 $H_2SO_4$, 18.3 HCl, in cathode chamber there are 460 ml of sodium and potassium hydroxide solution, which contains, g/l: 463.9 NaOH, 56.2 KOH, and in the middle chamber there are 1.150 ml of demineralized mother liquor which contains 1.17 g/l of the following ions: $NO_3^-$, $SO_4^{2-}$, $Cl^-$, $Na^+$, $K^+$ and 3.1 g/l of $H_3BO_3$. Ion extraction from the mother liquor is 99.6%. The current yield of electrodialysed products is 60%.

EXAMPLE 3

We take 1,000 ml of initial borate solution which contains, g/l: 101.9 $Na^+$, 19 $K^+$, 141.1 $NO_3^-$, 4.8 $SO_4^{2-}$, 15.1 $Cl^-$, 80.3 $H_3BO_3$, solution pH=8.2. pH of initial solution is upgraded to reach the value of 10.1 by adding 82 ml of NaOH solution (8.5 mole/l) After that 236 ml of $Ca(NO_3)_2$ solution (5.5 mole/l) are added to borate solution As a result a co-precipitation of calcium borate and sulfate is generated. After the generated co-precipitation is separated from the solution using the method of filtration, 1.250 ml of mother liquor are electrodialysed, and co-precipitated calcium borate and sulfate are used for producing boric acid.

Co-precipitated calcium borate and sulfate are treated with the solution which contains nitric acid (103 ml with concentration=12.2 mole/l) and 200 ml of water to reach the value of pH=6.6 with further conversion of calcium borate into a solution and separation of calcium sulfate precipitation (6.8 g) which, in terms of the equivalent amount of anhydrous salt, is 1.9% of overall salt content in the mother liquor. After that the sodium borate solution is treated with nitric acid solution (103 ml, concentration=12.2 mole/l) at a temperature of 18° C. to reach the value of pH=2. The generated boric acid co-precipitation is separated from calcium nitrate solution, then washed with nitrate solution (pH=2) which contains boric acid (concentration=33 g/l) and dried at a temperature of 40° C. As a result 69.3 g of boric acid are generated. The calcium nitrate solution is added to the initial borate solution after separation of boric acid precipitation.

The mother liquor is electrodialysed in a 3-chamber electrodialysis device with cathion- and anion-exchange membranes. 1.250 ml of mother liquor are exposed to electrodialysis, the solution contains, g/l: 241.8 $NO_3^-$, 1.4 $SO_4^{2-}$, 12.1 $Cl^-$, 94.3 $Na^+$, 15.2 $K^+$ and 1.9 $H_3BO_3$, with I=1 A, V=4 V and following the proportion: $V_{Mp}:V_a$=1:0.6 and $V_{Mp}:V_K$=1:0.6 to have as a result 750 ml of nitirc acid solution generated in the anode chamber, this solution contains, g/l: 409.5 $HNO_3$, 2.38 $H_2SO_4$, 27.7 HCl, in cathode chamber there are 750 ml of sodium and potassium hydroxide solution, which contains, g/l: 273.3 NaOH, 36.4 KOH, and in the middle chamber there are 1,250 ml of demineralized mother liquor which contains 2.42 g/l of the following ions: $NO_3^-$, $SO_4^{2-}$, $Cl^-$, $Na^+$, $K^+$ and 1.9 g/l of $H_3BO_3$. Ion extraction from the mother liquor is 99%. The current yield of electrodialysed products is 70%.

EXAMPLE 4

We take 1,000 ml of initial borate solution which contains, g/l: 155.8 $Na^+$, 11.2 $K^+$, 227 $NO_3^-$, 6 $SO_4^{2-}$, 3.8 $Cl^-$, 18 $H_3BO_3$, solution pH=12. pH of initial solution is upgraded to reach the value of 10.6 by adding 130 ml of $HNO_3$ solution (4 mole/l) After that 62 ml of $Ca(NO_3)_2$ solution (5.5 mole/l) are added to borate solution As a result a co-precipitation of calcium borate and sulfate is generated. After the generated co-precipitation is separated from the solution using the method of filtration, 1.190 ml of mother liquor are electrodialysed, and co-precipitated calcium borate and sulfate are used for producing boric acid.

Co-precipitated calcium borate and sulfate are treated with the solution which contains nitric acid (23 ml with concentration=12.2 mole/l) and 150 ml of water to reach the value of pH=6.2 with further conversion of calcium borate into a solution and separation of calcium sulfate precipitation (8.5 g) which, in terms of the equivalent amount of anhydrous salt, is 2% of overall salt content in the mother liquor. After that the sodium borate solution is treated with nitric acid solution (23 ml, concentration=12.2 mole/l) at a temperature of 16° C. to reach the value of pH=2.3. The generated boric acid co-precipitation is separated from calcium nitrate solution, then washed with nitrate solution (pH=2.3) which contains boric acid (concentration=33 g/l) and dried at a temperature of 57° C. As a result 15.6 g of boric acid are generated. The calcium nitrate solution is added to the initial borate solution after separation of boric acid precipitation.

The mother liquor is electrodialysed in a 3-chamber electrodialysis device with cathion- and anion-exchange membranes. 1,190 ml of mother liquor are exposed to electrodialysis, the solution contains, g/l: 346 $NO_3^-$, 0.8 $SO_4^{2-}$, 3.2 $Cl^-$, 130.9 $Na^+$, 9.44 $K^+$ and 0.6 $H_3BO_3$, with I=3 A, V=10 V and following the proportion: $V_{Mp}:V_a$=1:1 and $V_M:V_K$=1:0.5 to have as a result 1.190 ml of nitirc acid solution generated in the anode chamber, this solution contains, g/l: 352 $HNO_3$, 0.81 $H_2SO_4$, 3.3 HCl, in cathode chamber there are 595 ml of sodium and potassium hydroxide solution, which contains, g/l: 455.3 NaOH, 27.0 KOH, and in the middle chamber there are 1190 ml of demineralized mother liquor which contains 1.04 g/l of the following ions: $NO_3^-$, $SO_4^{2-}$, $Cl^-$, $Na^+$, $K^+$ and 0.6 g/l of $H_3BO_3$. Ion extraction from the mother liquor is 99.7%. The current yield of electrodialysed products is 50%.

EXAMPLE 5

We take 1,000 ml of initial borate solution which contains, g/l: 89.2 $Na^+$, 22.4 $K^+$, 132.7 $NO_3^-$, 17.3 $SO_4^{2-}$, 11.7 $Cl^-$, 37 $H_3BO_3$, solution pH=10.7. After that 336 ml of $Ca(NO_3)_2$ solution (4 mole/l) are added to borate solution As a result a co-precipitation of calcium borate and sulfate is generated. After the generated co-precipitation is separated from the solution using the method of filtration, 1,220 ml of mother liquor are electrodialysed, and co-precipitated calcium borate and sulfate are used for producing boric acid.

Co-precipitated calcium borate and sulfate are treated with the solution which contains nitric acid (53 ml with concentration=12.2 mole/l) and 150 ml of water to reach the value of pH=6 with further conversion of calcium borate into a solution and separation of calcium sulfate precipitation (24.5 g) which, in terms of the equivalent amount of anhydrous salt, is 7.9% of overall salt content in the mother liquor. After that the sodium borate solution is treated with nitric acid solution (53 ml, concentration=12.2 mole/l) at a temperature of 20° C. to reach the value of pH=2. The generated boric acid co-precipitation is separated from calcium nitrate solution, then washed with nitrate solution (pH=2) which contains boric acid (concentration=35 g/l) and dried at a temperature of 60° C. As a result 36.1 g of boric acid are generated. The calcium nitrate solution is added to the initial borate solution after separation of boric acid precipitation.

The mother liquor is electrodialysed in a 3-chamber electrodialysis device with cathion- and anion-exchange membranes. 1.220 ml of mother liquor are exposed to electrodialysis, the solution contains, g/l: 198.4 $NO_3^-$, 0.9 $SO_4^{2-}$, 9.6 $Cl^-$, 79.1 $Na^+$, 18.4 $K^+$ and 2.5 $H_3BO_3$, with I=1 A, V=5 V and following the proportion: $V_{Mp}:V_a$=1:0.6 and $V_{Mp}:V_K$=1:0.5 to have as a result 732 ml of nitirc acid solution generated in the anode chamber, this solution contains, g/l: 336 $HNO_3$, 1.53 $H_2SO_4$, 16.4 HCl, in cathode chamber there are 610 ml of sodium and potassium hydroxide solution, which contains, g/l: 275.1 NaOH, 53.1 KOH, and in the middle chamber there are 1220 ml of demineralized mother liquor which contains 1.98 g/l of the following ions: $NO_3^-$, $SO_4^{2-}$, $Cl^-$, $Na^+$, $K^+$ and 2.5 g/l of $H_3BO_3$. Ion extraction from the mother liquor is 99%. The current yield of electrodialysed products is 70%.

From the above description and Examples 1-5 it is clear that the proposed method of liquid nuclear waste recycling, as compared with the prototype method, allows for production of marketable boric acid (in crystallized form) and highly concentrated solutions of boric acid (up to 648.3 g/l) and sodium hydroxide (up to 463.9 g/l) and potassium hydroxide (up to 181.4 g/l) which are suitable for re-use in NPP process cycle and for general industrial needs. Electrodialysis carried out at lower values of current intensity and voltage ensures lower energy consumption. The fact that all major components of waste mother liquors are involved in the process of recycling means less hazardous waste to be further buried and stored. Mostly standard chemical equipment is used for this embodiment.

The invention claimed is:

1. A method of liquid waste processing for a nuclear power plant (NPP) with boron control, wherein a waste comprises sodium and potassium salts, the method including:
   a) introduction of calcium nitrate into a borate solution to provide a resulting composition, precipitation of calcium borate, and separation of the calcium borate from a mother liquor of the separated calcium borate;
   b) obtaining solutions of boric acid and sodium and potassium hydroxides; and
   c) electrodialysis with the use of an electrodialysis device with cation-exchange and anion-exchange membranes;
   wherein in step a) the borate solution, as sodium and potassium salts, comprises nitrates and sulphates of both sodium and potassium, wherein the introduction of calcium nitrate into the borate solution causes a co-precipitation of the calcium borate and calcium sulphate;
   wherein in step b) the obtaining the solution of boric acid is achieved by treating the co-precipitated calcium borate and calcium sulphate with a solution of nitric acid and separating the calcium sulfate precipitate from a solution of calcium borate, which is followed by treating the solution of calcium borate with nitric acid to cause formation of a precipitate of boric acid and a solution of calcium nitrate, and separating and drying the precipitate of boric acid; and wherein step c) comprises directly subjecting the mother liquor to electrodialysis to obtain solutions of nitric acid and sodium and potassium hydroxides.

2. The method according to claim 1, wherein the calcium nitrate is introduced into the borate solution at a pH of 9.3-11.0.

3. The method according to claim 1, wherein the co-precipitated calcium borate and calcium sulphate are treated with the nitric acid solution until a pH of 5-7 is provided.

4. The method according to claim 1, wherein the calcium borate solution is treated with the nitric acid at a temperature of 10-20° C. until a pH of 1-3 is provided.

5. The method according to claim 1, wherein, after separation of the precipitate of boric acid, the solution of calcium nitrate is added to the borate solution.

6. The method according to claim 1, wherein the electrodialysis of the mother liquor is conducted in a three-chamber electrodialysis device at the ratio of the mother liquor volume $V_{ml}$ in the middle chamber of the electrodialysis device to the volumes of the anolyte $V_a$ and the catholyte $V_c$ in the anodic and cathodic chambers, respectively, equal to $V_{ml}:V_a=1:0.5-1.0$ and $V_{ml}:V_c=1:0.4-0.6$, thereby obtaining the solution of nitric acid in the anodic chamber, and the solution of sodium and potassium hydroxides in the cathodic chamber.

7. The method according to claim 1, wherein the electrodialysis is executed at a current value of 1-3 A and a voltage of 4-10 V.

8. The method according to claim 1, wherein the boric acid precipitate is washed with a nitrate solution of pH 2-3, comprising 30-35 g/l of boric acid.

9. The method according to claim 1, wherein the boric acid precipitate is dried at a temperature not exceeding 60° C.

* * * * *